United States Patent [19]

Lokken

[11] Patent Number: 5,072,577
[45] Date of Patent: Dec. 17, 1991

[54] CUTTING HEIGHT GUAGE

[76] Inventor: Ernest C. Lokken, Box 1345, Weyburn, Saskatchewan, Canada, S4H 3J9

[21] Appl. No.: 573,324

[22] Filed: Aug. 27, 1990

[51] Int. Cl.⁵ .............................................. A01D 67/00
[52] U.S. Cl. ...................................... 56/208; 172/431
[58] Field of Search ................... 56/17.1, 17.2, 121.46, 56/208; 172/431

[56] References Cited

U.S. PATENT DOCUMENTS

| 3,398,516 | 8/1968 | Quick | 56/208 |
| 3,707,834 | 1/1973 | Schumaker et al. | 56/208 |

FOREIGN PATENT DOCUMENTS

| 983787 | 2/1976 | Canada. | |
| 1055322 | 5/1979 | Canada. | |
| 1021619 | 3/1966 | United Kingdom | 56/208 |

Primary Examiner—David J. Bagnell

[57] ABSTRACT

A device for indicating the height of a moveable platform with cutting bar of a harvesting machine above the terrain over which it passes in carrying out its function. The indicating device is mounted on a fixed operators cab or the frame of the harvester and includes a scale with indicia. Attached by a cable to the moveable platform is one end of an indicating rod slideably received and spring biased within the body of the device so that upon movement of the platform relative to the cab or frame the free end of the rod gives a reading on the indicia. In a further embodiment to be used on a different type of harvester the attaching cable is encased in a sheath to enable force transfer at various angles.

14 Claims, 2 Drawing Sheets 5,072,577

CUTTING HEIGHT GUAGE

FIELD OF INVENTION

This application relates to indicators and more particulary to indicators that will indicate the cutting height of a crop harvesting platform above the terrain.

BACKGROUND OF INVENTION

Harvesting machines normally have a crop cutting means to sever the standing crop. The cutting means is generally mounted on a table or platform which receives the cut crop and transports it to a desired location. When the harvester is used in rolling or rocky land with an uneven growth of crop there is a tendency to miss some of the heads of the crop or to pick up dirt and stones. In some cases it is desirable to leave varying heights of stubble for better snow retention. An operator controlling the cutting height of the machine would therefore find it advantageous to know just where the cutting bar is above the terrain especially at night. Solutions to this type of problem are found in Canadian Patents 1055322 and 983787. Patent "322" teaches a height indicating device using a number of transversely spaced radial feeler arms mounted on a rockshaft and is engageable with individual vertically adjustable harvesting elements with the rockshaft being connected to a visual indicator at the side of the platform. Applicants device is connected to the frame with a visual indicator moveable relative to the frame and actuated by movement of the platform with cutter bar. Patent "787" teaches a working implement mounted on a machine using first and second cam means to operate a calibrated gauge to indicate its position while applicants device uses a direct force on a biased rod actuated by the movement of a platform with cutter bar.

SUMMARY OF THE INVENTION

An indicating device is disclosed herein that indicates relative movement between a reference body and a moveable body connected to the reference body. A scale means is normally mounted on the reference body with the indicator means moveable in close proximity thereto. The indicator means with controlling biasing means is mounted in a body member fixed to the reference body. The biasing means is fixed to the body member at the top and to the indicator means at the bottom so that movement of the moveable body causes the indicator to move past the scale means giving a reading to be interpreted by the operator of a machine having the indicating device mounted thereon.

With the above summary in mind it is considered a main object of the instant invention to provide an indicator to enable the operator of a machine so equipped to easily ascertain the elevation of the working head of the machine above the terrain.

It is a further object of the present invention to provide an indicator that will enable a harvester operator to leave the most desirable length of stubble.

It is a further object of the present invention to provide an inexpensive accurate mechanical indicating device.

It is yet a further object of this invention to provide an easily manufactured, easily readable indicating apparatus.

It is yet another object of this invention to provide an easily installed and reliable indicating device.

Other objects and a fuller understanding of applicants invention will be had by referring to the following detailed description and drawings wherein like reference numerals will indicate like elements throughout.

DETAILED DESCRIPTION OF THE PREFERRED EMBODIMENT

Figure 1:
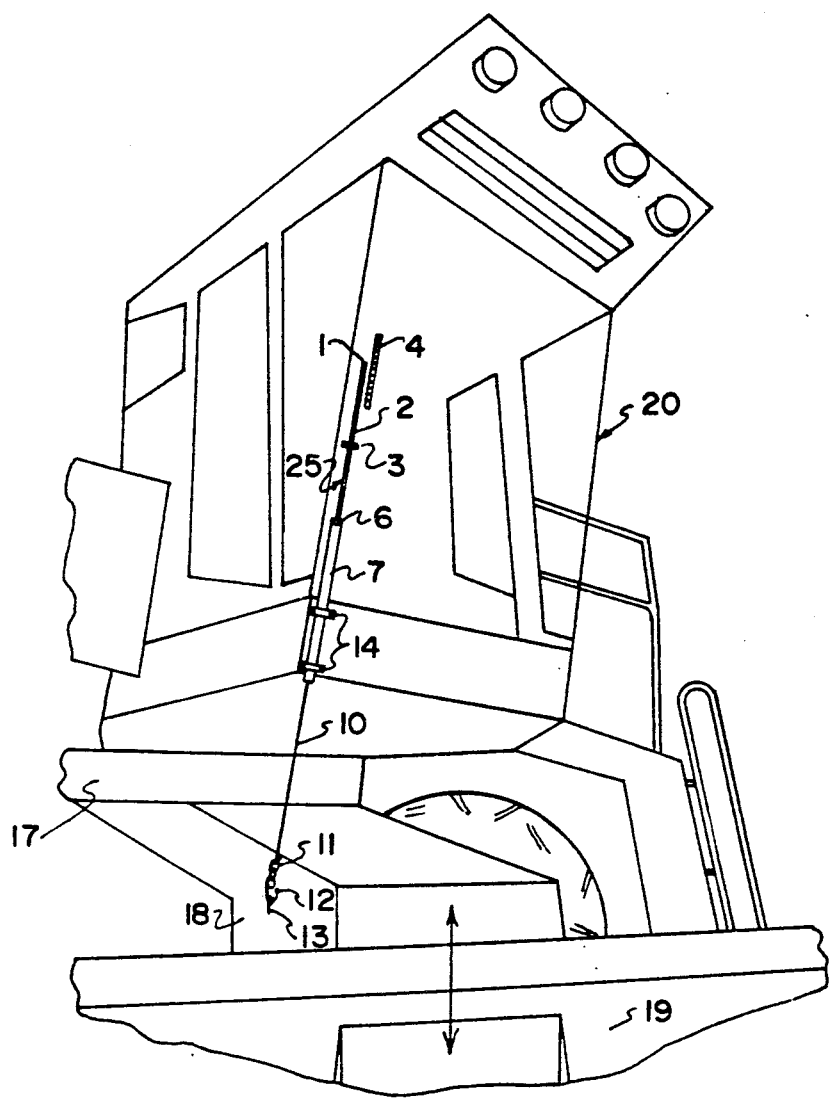
FIG. 1 is a partial perspective view of the indicating device as mounted on the operators cab of a harvester.

Referring now to the drawings there is shown in FIG. 1 the indicating device in general designated as 25 mounted by mounting straps 14 on a machine operators cab 20 with the actuating cable 10 affixed to the feeder 18. Feeder 18 is pivotally mounted on the machine frame 17 and has at its distal end a platform 19 which carries a cutting knife (not shown). The cable 10 fastened to the feeder 18 moves the indicator rod 2 under control of biasing spring 8 inside of the tubular body 7 when the feeder 18 is caused to pivot by operator controlled hydraulic means (not shown). On the window of the cab 20 is placed a scale 4 which may be separately mounted numerals or a unit of numerals each of which may require calibration depending on the degree of relative movement of the feeder 18 and the cab 20. The scale 4 may also be attached to the tubular body 7.

Figure 2:
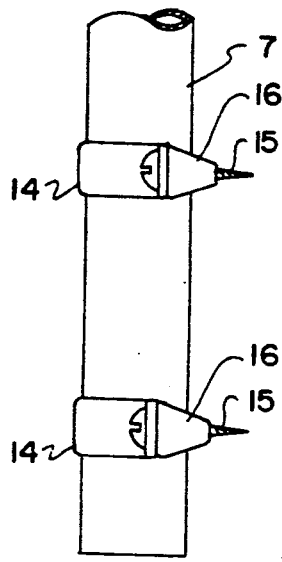
FIG. 2 is a partial view of the tubular body of the indicating device with mounting clamps.

Referring now to FIG. 2 there is shown the lower portion of the tubular body 7 supportable by two mounting straps 14 secureable to the cab 20 by two mounting screws 15 and spaced therefrom by spacers 16 which are normally required to allow for rubber moulding on the windshield of cab 20.

Figure 3:
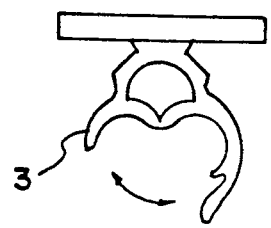
FIG. 3 is a plan view of the windshield rod guide in the open position.

Referring now to FIG. 3 there is shown the windshield rod guide 3 which normally is affixed by adhesive means to the windshield and is closeable to enclose the indicating rod for the guiding and supporting thereof.

Figure 4:
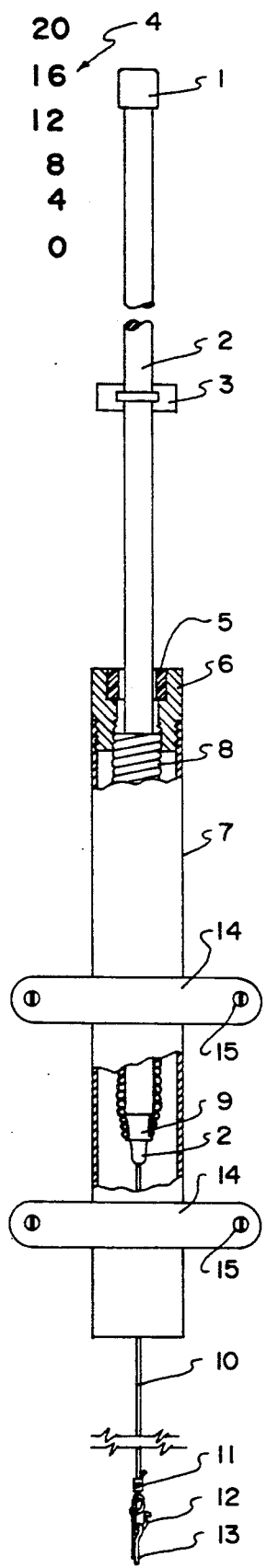
FIG. 4 is a front elevation forshortened and partially sectioned for clarity.

For a more detailed view of applicants preferred embodiment reference is now made to FIG. 4 where separate or unitized numerals of the scale 4 are spaced and placed on the of the cutting knife from the ground so the operator can make adjustments for the most desirable height. The cutting knife height is indicated by a readily visible tip 1 on the indicating rod 2 which is normally a one piece fiber glass rod. Rod guide 3 is normally fixed by adhesive to the windshield of the cab 20. An overcenter snap action by a force applied to the open ends causes the rod guide 3 to encircle and thereby guide the indicating rod 2 as it moves up and down. The indicating rod 2 terminates at its lower end inside a tubular body 7 which is fastened to cab 20 by two mounting straps 14 and mounting screws 15 as more clearly shown in FIG. 2. At the upper end of tubular body 7 there is an upper bushing 6 threaded therein and carrying a ferrule 5 normally of nylon to guide the indicating rod 2 in its up and down movement. The indicating rod 2 is normally held in position and moved under control of a biasing spring 8. Biasing spring 8 is fastened to the upper bushing 6 at the top and at the bottom to a copper spring stop 9 or other equivalent means which is fixed to reduced portion of the indicating rod 2. A hole is drilled at the lower extremity of indicating rod 2 along its axis to receive a normally stainless steel aircraft cable 10 which is cemented therein. The cable 10 can be attached by various other means. Cable 10 extends out of the lower end of tubular body 7 where it terminates in a small loop formed by crimping ovals 11. Through the loop passes a cross lock snap 12 and through cross lock snap 12 a cotter pin 13 is received. The cotter pin 13 passes through a hole drilled in the moveable feeder 18 thereby anchoring the cable 10 which moves the indicating rod 2 under control of the biasing spring 8 when the feeder 18 is moved normally by hydraulics controlled by the machine operator.

Figure 5:
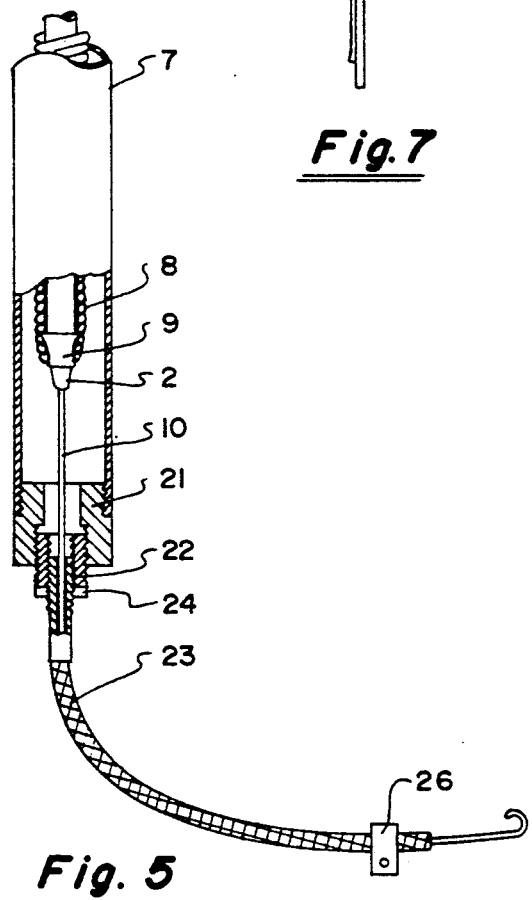
FIG. 5 is a partial front elevation of the lower portion of the invention adapted for another type of harvesting machine.

As an adaption for a self propelled swather the indicating device takes the form as shown in FIG. 5 where the lower portion of the tubular body 7 has added to it a first reducer bushing 21 which in turn receives a second reducer bushing 22 which receives a threaded end of cable sheath 23 which is secured by a mounting clip 26. The threaded end of cable sheath 23 is locked in position by a lock nut 24.

Figure 6:
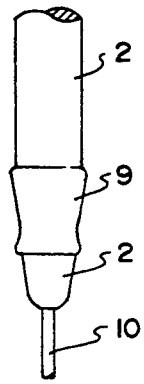
FIG. 6 is a partial lower end portion of the indicating rod with spring stop attached.

Now referring to FIG. 6 we have an enlarged partial view of the lower end of the indicating rod 2 which has been reduced in diameter to receive a spring stop 9 which is normally made of copper and is flared to lockingly receive the lower end of the biasing spring 8. As previously stated a hole is drilled along the axis of indicating rod 2 and the cable 10 is cemented therein. Other means of connecting the biasing spring 8 and cable 10 are envisaged.

Figure 7:
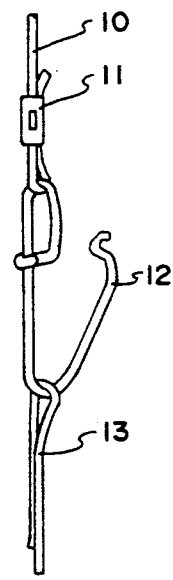
FIG. 7 is a detailed view of cable fastening means.

Referring now to the remaining FIG. 7 there is shown an enlarged lower end of cable 10 looped and secured by a crimping oval 11. Through the loop passes a cross lock snap 12 carrying a cotter pin 13 whereby the cable is fastened to the moveable feeder 18 which in turn carries the platform 19 and cutting knife (not shown).

Operation

In operation the operator of the harvesting machine makes a decision, considering many factors, as to what will be the best height to have the platform 19 with cutting knife (not shown) traverse the terrain. To carry out the objective the operator in the cab 20 normally operates hydraulic controls which cause the platform 19 to move relative to the frame 17 upon which the cab 20 is fixedly mounted. To maintain the desirable cutting height established, especially at night, it has been found that an indicating device 25 mounted on the fixed cab 20 and actuated by movement of the attached feeder and platform 18 and 19 respectively is possible. The movement of the indicating rod 2 of the indicating device 25 moves past a scale 4 normally fixed to the windshield of the cab 20 interpreted by the operator who can make the appropriate adjustments if deemed necessary.

Although the invention has been described with a certain degree of particularity, it is understood that the present disclosure has been made only by way of example and that numerous changes 1 in the details of construction may be resorted to without departing from the spirit and scope of the invention as hereinafter claimed.

I claim:

1. The combination with a harvester machine provided with a frame, a feeder means pivotably supported on the frame and an operators cab fixedly mounted on said frame, of an indicating device comprising scale means mounted on said cab, elongated indicator means moveable relative to said scale means, a tubular body member fixedly mounted on said cab in close proximity to said scale means and adapted to receive said elongated indicator in a telescoping manner, elastic biasing means located internally of said tubular body and having one end fixed to an upper end of said tubular body and the other end to an end of the elongated indicator received in said tubular body, the opposite end of said elongated indicator being of a readily visible nature to contrast with the scale means, fastening means attached to the end of the elongated indicator means received in said tubular body enabling fastening to the pivotable feeder whereby a pivoted movement of the feeder will elongate the elastic biasing means and move the attached elongated indicator thereby giving relative movement of the readily visible elongated indicator end to the scale means enabling a height determination by the machine operator.

2. The combination as claimed in claim 1 further including a guide means attached to said operators cab to stabilize the elongated indicator during movement.

3. The combination as claimed in claim 1 further including guide means located in the upper end of said tubular body 1 for guiding said elongated indicator.

4. The combination as claimed in claim 3 wherein the scale means is a series of separate indicia.

5. The combination as claimed in claim 3 wherein the elongated indicator is a fiber glass rod.

6. The combination as claimed in claim 3 wherein the elastic biasing means is a spiral spring surrounding said elongated indicator.

7. A position indicating apparatus for indicating relative movement between a machine body and a working head moveably connected to said machine body comprising, a slim tubular body member fixed to said machine body, scale means attached to said machine body, an elongated glass rod indicator including a nighttime visible distal end positioned in close proximity to said scale means and extending well beyond said slim tubular body member, an elongated helical coil biasing means having an upper end attached to said slim tubular body member and having a lower end attached to said glass rod indicator, said elongated helical coil biasing means internally slideably supporting said elongated glass rod indicator, fastening means connecting said elongated helical coil biasing means lower end to said moveable working head to actuate said glass rod indicator upon relative movement between the machine body and the moveable working head.

8. A position indicating apparatus as claimed in claim 7 wherein said fastening means includes a flexible cable.

9. A position indicating apparatus as claimed in claim 8 further including a flexible sheath slideably supporting a portion of said flexible cable.

10. A position indicating apparatus as claimed in claim 9 wherein said machine body is in the form of a crop harvester body and said moveable working head is in the form of a crop feeder.

11. A position indicating apparatus as claimed in claim 10 wherein said scale means are separate indicia each attached to said machine body a calibrated distance apart.

12. A position indicating apparatus as claimed in claim 10 wherein said scale means are attached to said machine body by being firstly attached to said slim tubular body member.

13. In a harvesting machine having a frame, an operators cab fixed to the frame and including a frontal viewing area, an adjustable working head moveably mounted on the frame and a working head position indicator mounted on said operators cab, said working head position indicator comprising, scale means attached to said operators cab at the frontal viewing area, an elongated glass rod indicator moveable relative to said scale means and in close proximity thereto, a slim tubular body member mounted on said operators cab, an elongated biasing means having an upper end attached to said slim tubular body member, said elongated biasing means, internally slideably supporting said elongated glass rod indicator, an adjustable working head fastener is connected at a first end to said adjustable working head and at a second end simultaneously to said glass rod indicator and a lower end of said elongated biasing means whereby movement of said adjustable working head causes a movement of said glass rod indicator past said scale means to give an operator a visual indication of the degree of movement of the working head.

14. In a harvesting machine as claimed in claim 13 wherein the scale means comprises separately mounted indicia applied a calibrated distance apart, and wherein the elongated glass rod indicator includes a tip in close proximity to said indicia that is highly visible at night.

* * * * *